United States Patent
Suga (10) Patent No.: US 10,645,640 B2
(45) Date of Patent: May 5, 2020

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Kenichiro Suga, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/867,536

(22) Filed: Jan. 10, 2018

(65) Prior Publication Data

US 2018/0132169 A1    May 10, 2018

Related U.S. Application Data

(63) Continuation of application No. 15/099,476, filed on Apr. 14, 2016, now Pat. No. 9,900,830, which is a continuation of application No. 14/332,218, filed on Jul. 15, 2014, now Pat. No. 9,344,957.

(30) Foreign Application Priority Data

Jul. 19, 2013   (JP) ................................. 2013-150369

(51) Int. Cl.
| | | |
|---|---|---|
| *H04W 4/00* | (2018.01) | |
| *H04W 48/16* | (2009.01) | |
| *H04W 8/00* | (2009.01) | |
| *H04W 60/04* | (2009.01) | |

(52) U.S. Cl.
CPC .......... *H04W 48/16* (2013.01); *H04W 8/005* (2013.01); *H04W 60/04* (2013.01)

(58) Field of Classification Search
CPC ..... H04W 8/005; H04W 48/16; H04W 48/18; H04W 48/20; H04W 60/04; H04W 76/023; H04W 80/04; H04W 84/12; H04W 84/18; H04W 84/20; H04W 84/22; H04W 88/06; H04W 88/08
See application file for complete search history.

(56) References Cited

U.S. PATENT DOCUMENTS

| | | | | |
|---|---|---|---|---|
| 8,050,709 B2* | 11/2011 | Hall | ...................... | H04W 12/08 101/2 |
| 8,621,071 B1* | 12/2013 | Scofield | .................. | G06F 21/43 709/220 |
| 2007/0146782 A1* | 6/2007 | Lehotsky | ............ | H04L 41/0886 358/1.15 |
| 2010/0254349 A1* | 10/2010 | Aibara | ................ | H04W 36/385 370/331 |
| 2011/0161697 A1* | 6/2011 | Qi | ......................... | G06F 1/3209 713/320 |

(Continued)

OTHER PUBLICATIONS

Demeter, Display module for wireless embedded communication system, IEEE, 4 pages, 2010.*

*Primary Examiner* — Frank Duong
(74) *Attorney, Agent, or Firm* — Canon U.S.A., Inc. IP Division (57) ABSTRACT

A communication apparatus identifies an access point with which the communication apparatus can perform wireless communication and transmits information indicating the identified access point to a communication partner apparatus by way of the wireless communication. In response to this, an access point designated by the communication partner apparatus is registered as a relay access point.

41 Claims, 4 Drawing Sheets

(56) References Cited

U.S. PATENT DOCUMENTS

| | | | | |
|---|---|---|---|---|
| 2012/0265913 | A1* | 10/2012 | Suumaki | H04W 4/08 |
| | | | | 710/303 |
| 2013/0311666 | A1* | 11/2013 | Fujii | H04L 69/18 |
| | | | | 709/228 |
| 2014/0240769 | A1* | 8/2014 | Tanji | H04W 4/70 |
| | | | | 358/1.15 |
| 2015/0230283 | A1* | 8/2015 | Li | H04W 76/14 |
| | | | | 455/41.1 |
| 2015/0334759 | A1* | 11/2015 | Hiramatsu | H04W 76/10 |
| | | | | 370/338 |

* cited by examiner

COMMUNICATION APPARATUS, COMMUNICATION METHOD, AND STORAGE MEDIUM

This application is a Continuation of U.S. application Ser. No. 15/099,476, filed Apr. 14, 2016, which is a Continuation of U.S. application Ser. No. 14/332,218, filed Jul. 15, 2014, now U.S. Pat. No. 9,344,957, issued May 17, 2016, which claims priority from Japanese Patent Application No. 2013-150369, filed Jul. 19, 2013. These applications are hereby incorporated by reference herein in their entireties.

BACKGROUND OF THE INVENTION

Field of the Invention

The present invention relates to a communication apparatus that performs wireless communication, a communication method, and a storage medium.

Description of the Related Art

Up to now, when wireless communication is performed, wireless communication with an intermediation of a relay access point (hereinafter, which will be referred to as AP) has been proposed. A setting for performing wireless communication between a communication apparatus that performs the wireless communication with the intermediation of the AP and the AP is to be conducted with respect to the communication apparatus at this time. As a system for conducting this setting, AirStation One-Touch Secure System (AOSS) and Wi-Fi Protected Setup (WPS) have been proposed. According to these systems, the setting for the wireless communication is conducted by pressing respective buttons of the communication apparatus and the AP at the same time or inputting a PIN code issued by the AP to the communication apparatus.

According to Japanese Patent Laid-Open No. 2005-032232, the following configuration is disclosed. That is, mutual communication apparatuses (such as a laptop PC and a printer) that desire to perform the wireless communication are connected by a wired interface. The laptop PC then obtains a list of APs that the printer can access, and a user selects a desired AP from the listed APs. Subsequently, a cryptography key for performing the communication with the AP selected by the user is input from the laptop PC, so that the setting (registration) for performing the wireless communication via the selected AP is conducted with respect to the printer.

However, in a case where the buttons are pressed at the same time, the communication apparatus and the AP are to be placed at locations where the pressing can be performed at the same time, and in a case where the registration is conducted via the wired interface, a job in which a fixed line cable is prepared and the communication apparatuses are mutually connected by using the fixed line cable is troublesome.

SUMMARY OF THE INVENTION

The present invention has been made to solve the above-mentioned problems and provides a communication apparatus that can easily perform a registration of a relay access point, a communication method, and a storage medium.

To solve the above-described problem, a communication apparatus according to an aspect of the present invention includes: a communication unit configured to perform wireless communication with a communication partner apparatus; an identification unit configured to identify an access point that can be selected by the communication unit; a transmission unit configured to transmit information indicating the access point identified by the identification unit to the communication partner apparatus, via the communication unit; a reception unit configured to receive information designating an access point from the communication partner apparatus to which the information indicating the access point has been transmitted by the transmission unit, via the communication unit; and a registration unit configured to register the access point corresponding to the information received by the reception unit as a relay access point used when the communication apparatus operates in an infrastructure mode.

Further features of the present invention will become apparent from the following description of exemplary embodiments with reference to the attached drawings.

DESCRIPTION OF THE EMBODIMENTS

Exemplary Embodiment

Hereinafter, with reference to the drawings, an exemplary embodiment of the present invention will be described in detail for illustrative purposes. Relative arrangements of constituent elements, display screens, and the like described according to the present exemplary embodiment are not intended to limit the configurations to those only.

Figure 1:
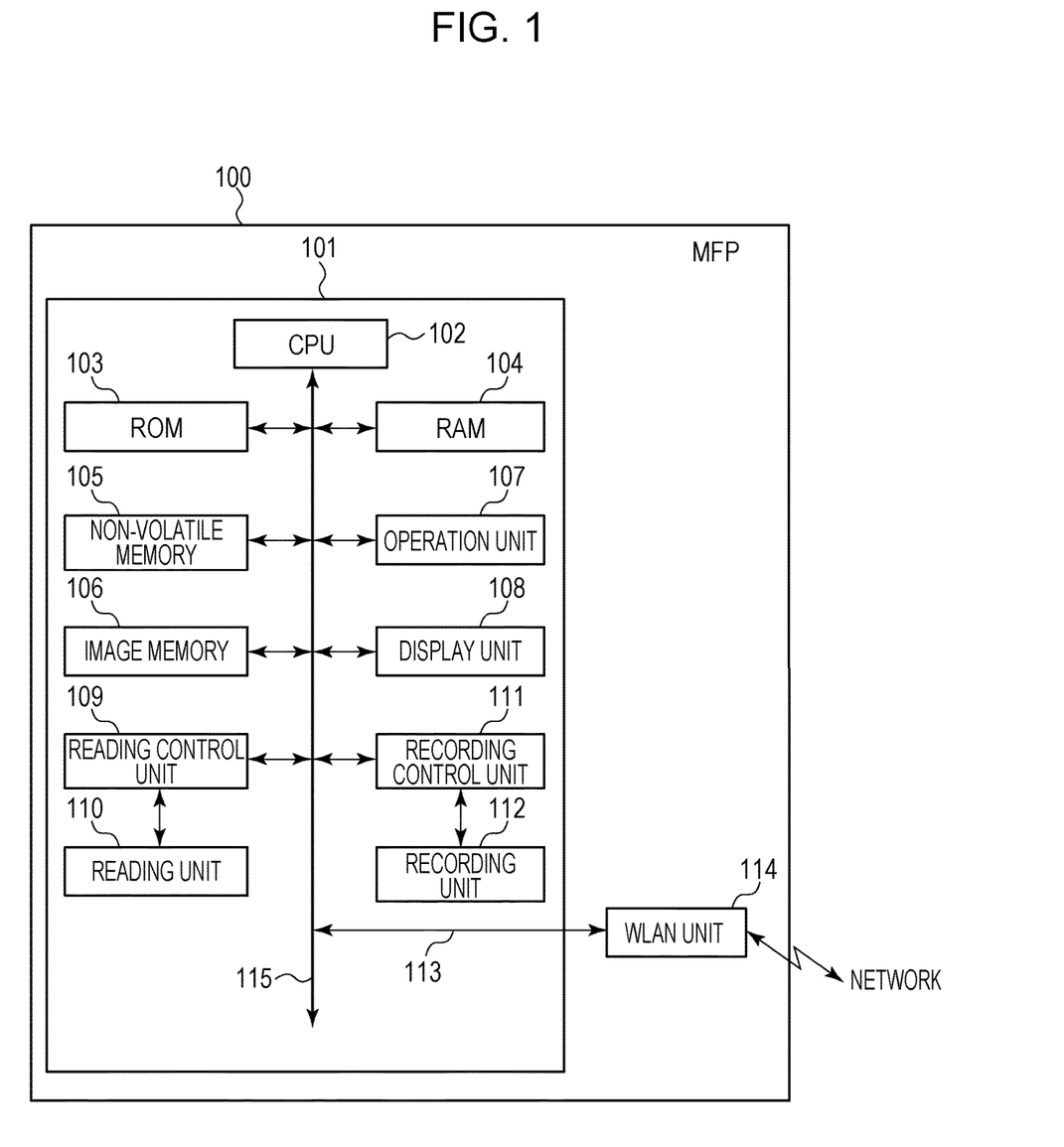
FIG. 1 illustrates a configuration of an MFP.

FIG. 1 is a block diagram illustrating a schematic configuration of a multi function printer (MFP) 100 having a wireless LAN (WLAN) communication function which corresponds to a communication apparatus according to an exemplary embodiment of the present invention. Herein, the apparatus having a reading function and a recording (printing) function has been taken as an example for the MFP 100, but the present invention can also be applied to apparatuses having various functions such as an apparatus that does not have one or both of these reading and recording functions but has other functions and an apparatus that has these functions as well as other functions. A telephone and facsimile function (for a telephone circuit/for an IP network), a short distance wireless communication function (Bluetooth (registered trademark) communication, near field communication (NFC)) and the like can be adopted as the other functions.

The MFP 100 includes a CPU 102, a ROM 103, a RAM 104, a non-volatile memory 105, an image memory 106, an operation unit 107, a display unit 108, a reading control unit 109, and a recording control unit 111 on a main board 101. The MFP 100 also includes a WLAN unit 114 connected via a bus cable 113. These constituent elements are connected to each other via a system bus 115 and are mutually communicable via the system bus 115. In addition, the MFP 100 further includes a reading unit 110 configured to realize a reading function of reading an image on an original and a recording unit 112 configured to realize a recording function of recording the image on a recording medium.

The CPU 102 controls an entirety of the MFP 100. Processing by the MFP 100 which will be described below is executed by the control of the CPU 102. The ROM 103 stores control programs executed by the CPU 102, an embedded operating system (OS) program, and the like. According to the present exemplary embodiment, the respective control programs stored in the ROM 103 perform software controls such as scheduling and task switch under a management of the embedded OS stored in the ROM 103. When a communication with a communication partner apparatus is performed, the CPU 102 operates a protocol stack in accordance with the programs stored in the ROM 103. At this time, a setting of a plurality of sockets used for a communication operation or the like is also conducted. The RAM 104 stores data such as a program control variable and also data such as a setting value registered by a user and management data for the MFP 100. In RAM 104, buffer areas for various works are provided. The non-volatile memory 105 is constituted by a memory such as a flash memory and keeps storing the data even when a power supply is turned OFF. The image memory 106 is constituted by a memory such as a dynamic RAM (DRAM) and accumulates image data input by the reading unit 110, image data received from an external part, and the like.

The operation unit 107 includes a hard switch and the like. The operation unit 107 accepts an operation from the user and informs the CPU 102 of the operation contents. The display unit 108 performs various displays related to the MFP 100 (a display for guiding an operation to be performed by the user and a display of information indicating a state of the MFP 100 or the like). It is also possible to adopt a touch panel or the like where the operation unit 107 and the display unit 108 are integrated with each other.

The reading control unit 109 controls the reading unit (scanner) 110 (for example, a contact type image sensor (CIS image sensor)) to optically read an image on an original and generates image data in accordance with the read image.

The recording control unit 111 converts the input image data into recording data to be recorded (printed) by the recording unit (printer) 112 and controls the recording unit 112 to apply a recording material to a recording medium such as paper to record the image. An inkjet printer configured to eject ink as the recording material from a recording head and record the image on the recording medium can be adopted as the recording unit 112.

The WLAN unit 114 performs a communication with a terminal on a network (a network where a communication following TCP/IP can be performed) by way of wireless communication. The WLAN unit 114 can perform, for example, a data (packet) communication in a WLAN system in conformity to IEEE802.11 series. In the wireless communication using the WLAN unit 114, a software access point (software AP) mode, a WFD mode for performing wireless communication based on Wi-Fi Direct (registered trademark) (WFD), and the like are prepared. In addition, the WLAN unit 114 can perform the wireless communication in an ad hoc mode without using the AP or an infrastructure mode via an external AP (relay AP).

The MFP 100 can operate by switching a WFD extend mode in which an extend service is performed on the basis of the WFD, the infrastructure mode in which the wireless communication is performed via a relay AP other than its own AP, the ad hoc mode, and the like in addition to the above described software AP mode and the WFD mode. These modes are not limited to modes that are exclusively set, and a plurality of modes may be set at the same time in some cases.

The software AP mode is a mode in which the MFP 100 operates as the AP on the basis of the software setting. While the MFP 100 operates in the software AP mode, since the MFP 100 periodically transmits a beacon signal (packet) including its own SSID and the like, other communication apparatus can detect the MFP 100 as the AP by performing an access point search. The SSID in a case where the MFP 100 itself operates as the AP is structured in a format following a previously determined rule, and communication partner apparatuses that understand this rule (format) can easily identify the MFP 100. The rule includes, for example, a combination of information for identifying a model of the MFP 100 or a series including this model, a MAC address of the MFP 100, a manufacturer name, and the like. This SSID is previously stored in the ROM 103 or the like.

In the WFD mode, the MFP 100 directly performs the wireless communication with another communication apparatus (communication partner apparatus) by way of peer-to-peer (P2P), and the MFP 100 itself becomes the AP or the communication partner apparatus becomes the AP on the basis of Group Owner Negotiation. In the WFD extend mode, a service that can be executed when a negotiation of a mutually corresponding service is further performed after the Group Owner Negotiation by the WFD is executed.

In the infrastructure mode, the MFP 100 performs the communication with the communication partner apparatus via an external relay AP. In order that the MFP 100 operates in the infrastructure mode, the relay AP that performs the wireless communication with the MFP 100 and a parameter for performing the wireless communication with this relay AP are to be registered in the MFP 100.

In the ad hoc mode, the MFP 100 and the communication partner apparatus directly perform the wireless communication by way of P2P. The ad hoc mode is different from the WFD mode and the WFD extend mode, and none of the apparatuses that perform the communication operate as the AP. In order that the MFP 100 operates in the ad hoc mode, a wireless communication parameter common to the communication partner apparatus is to be registered in the MFP 100.

Figure 2:
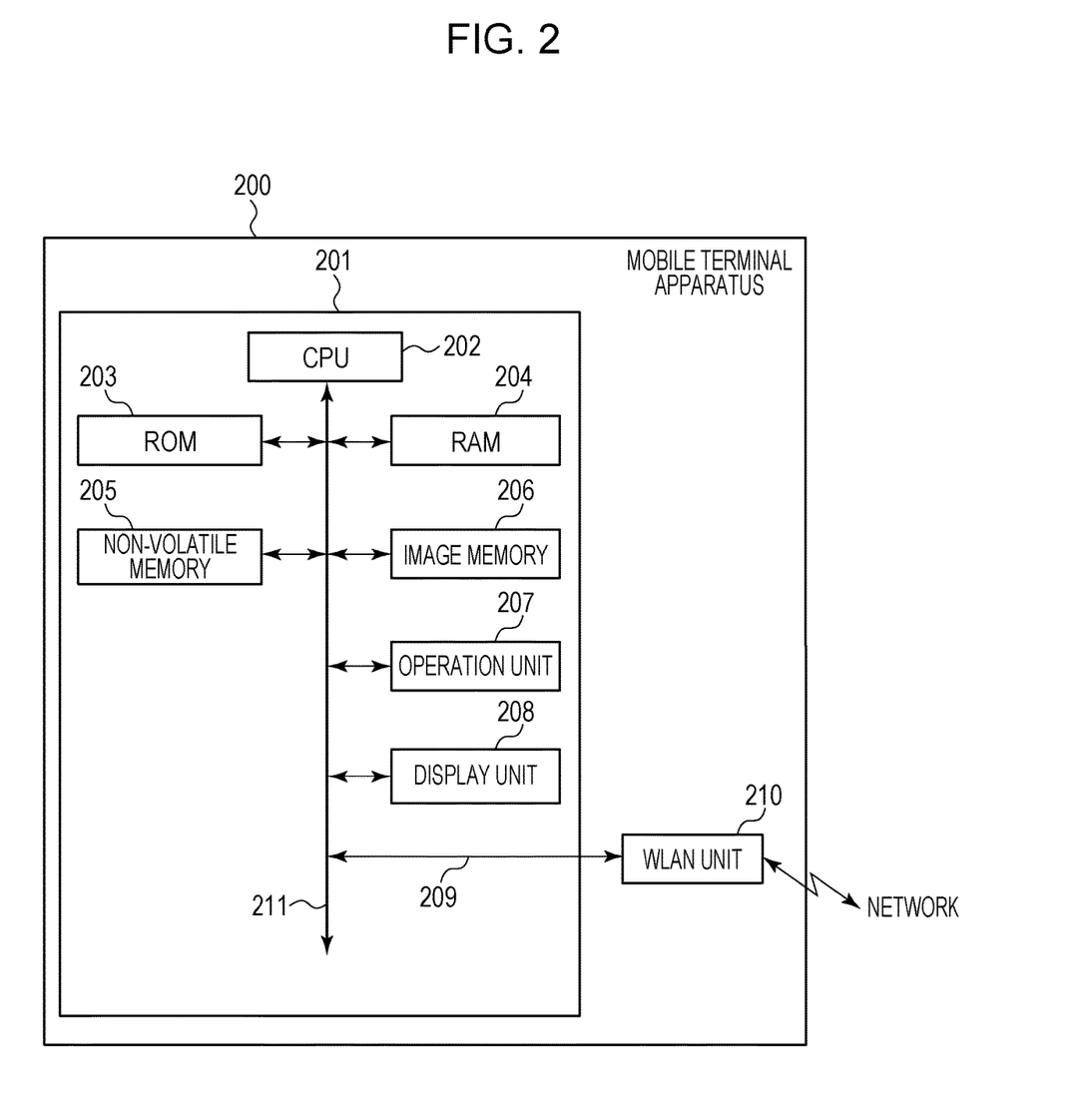
FIG. 2 illustrates a configuration of a mobile terminal.

FIG. 2 is a block diagram illustrating a schematic configuration of a mobile terminal 200 corresponding to the communication apparatus according to the exemplary embodiment of the present invention. Various devices such as a mobile phone, a smart phone, a laptop PC, a tablet terminal, a personal digital assistant (PDA), and a digital camera can be adopted as the mobile terminal 200.

The mobile terminal 200 includes a CPU 202, a ROM 203, a RAM 204, a non-volatile memory 205, an image memory 206, a operation unit 207, and a display unit 208 on a main board 201. The mobile terminal 200 also includes a WLAN unit 210 connected via a bus cable 209. These constituent elements are connected to each other by a system bus 211 and are mutually communicable via the system bus 211. A description of these respective constituent elements is similar to that of the constituent elements having the same designations illustrated in FIG. 1, and therefore the description thereof herein will be omitted.

The non-volatile memory 205 can also store various application software, and various functions can be realized when the CPU 202 executes the various application software. The application software includes a web browser function, an electronic mail function, and the like. In FIG. 2, main constituent elements of the mobile terminal 200 are illustrated. Other than these, various functions such as a telephone function, a camera function, a Bluetooth (registered trademark) communication function, an NFC function, a global positioning system (GPS) function, a microphone function, a speaker function, and a television receiving function may be included.

Next, a description will be given of processing of registering the relay AP used when the MFP 100 operates in the infrastructure mode in the MFP 100 by using the mobile terminal 200.

Figure 3:
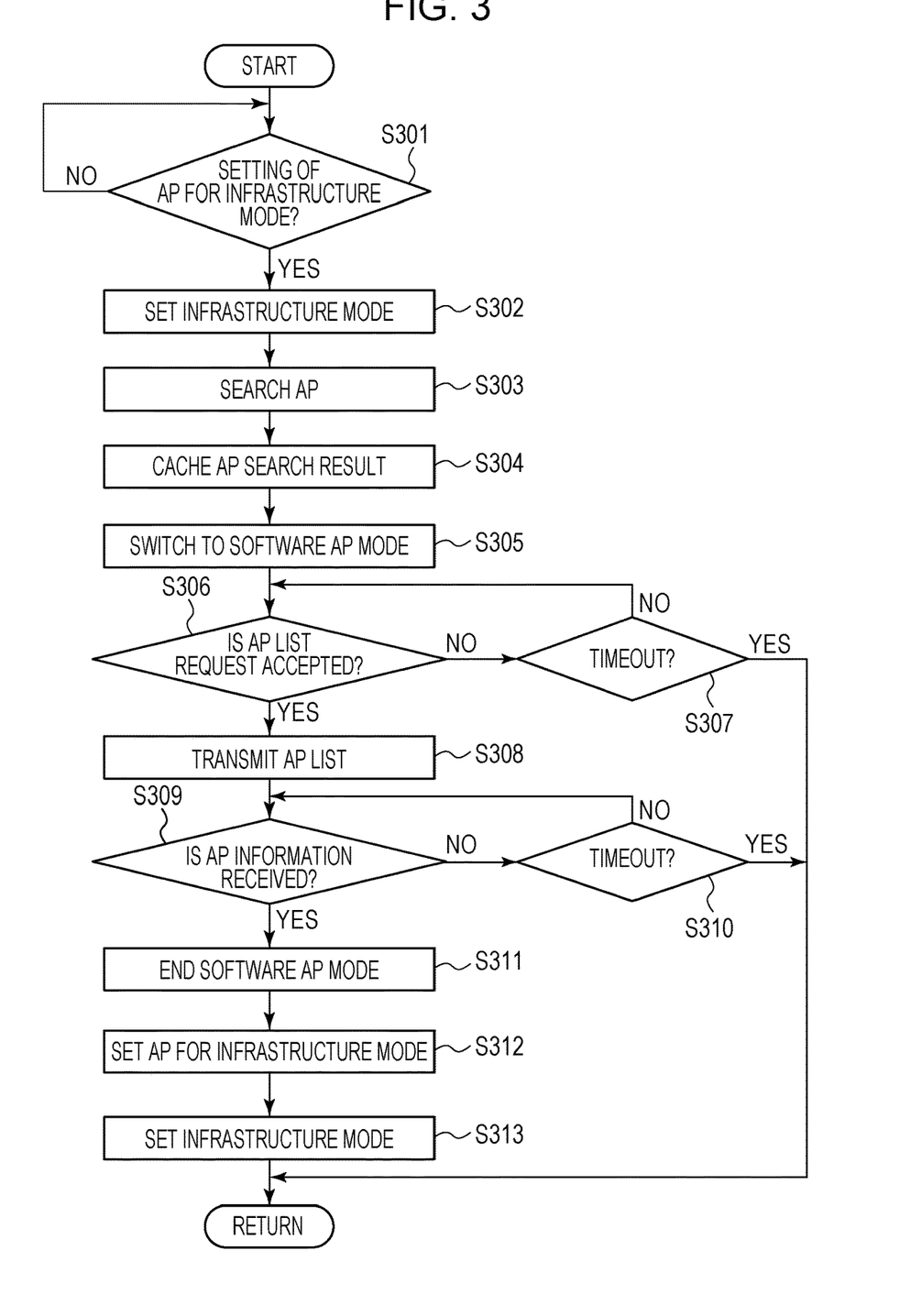
FIG. 3 is a flow chart illustrating a flow of processing by the MFP.
Figure 4:
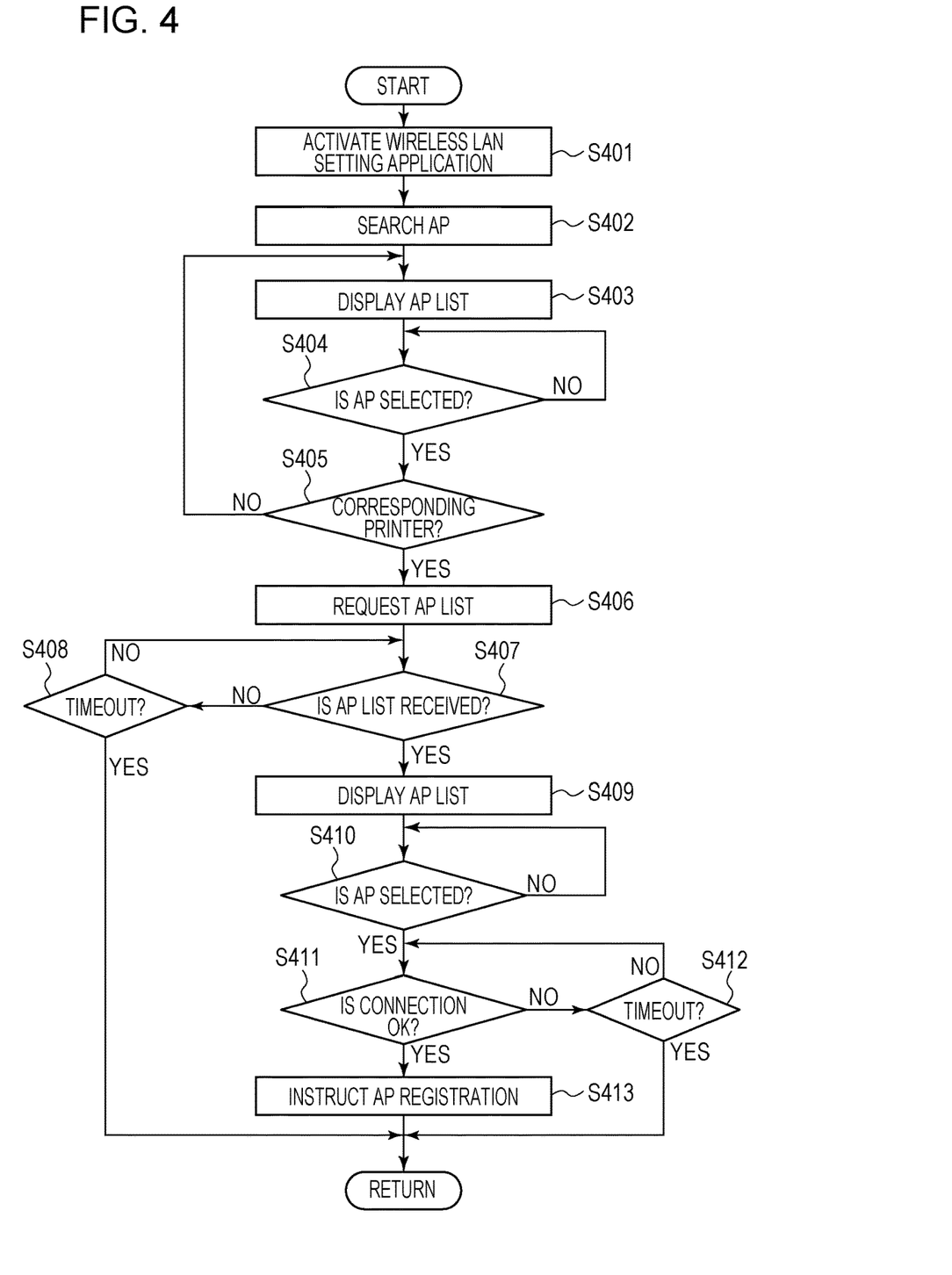
FIG. 4 is a flow chart illustrating a flow of processing by the mobile terminal.

FIG. 3 is a flow chart illustrating a flow of the processing performed by the MFP 100 in this case, and FIG. 4 is a flow chart illustrating a flow of the processing performed by the mobile terminal 200. FIG. 3 is the flow chart illustrating the flow of the processing performed when the CPU 102 of the MFP 100 loads the programs stored in the ROM 103 onto the RAM 104 to be executed. FIG. 4 is the flow chart illustrating the flow of the processing performed when the CPU 202 of the mobile terminal 200 loads the programs stored in the non-volatile memory 205 onto the RAM 204 to be executed.

In FIG. 3, when it is determined in S301 that a user performs an operation for setting (registering) an AP for the infrastructure mode by using the operation unit 107, the flow proceeds to S302, and the MFP 100 is set in the infrastructure mode.

In S303, the MFP 100 searches for the AP with which the MFP 100 itself can perform the wireless communication via the WLAN unit 114. When the AP is detected as a result of this search, in S304, information with which the AP can be identified such as a model name and an SSID received from the AP (information included in the beacon transmitted by the AP) is sequentially stored (cached) in the RAM 104. The timing for the detection of the AP is not limited to this timing, and a previously identified AP may be stored in the RAM 104. If the MFP 100 performs the detection of the accessible AP, the setting of the infrastructure mode may not be performed in S302. For example, the AP may be automatically searched for in a case where the AP registration mode for the infrastructure mode enters.

Subsequently, in S305, the MFP 100 switches the mode to the software AP mode. Accordingly, the MFP 100 periodically transmits the beacon including its own SSID and the like and is put in a state in which it is possible to provide the information included in the beacon for the AP search from the communication partner apparatus (the mobile terminal 200 or the like). At this time, if a connection request is issued from the communication partner apparatus, an exchange of the communication parameter or the like is performed, and an IP connection is executed.

In S306, it is determined whether or not an AP list request from the communication partner apparatus is accepted (received), and until it is determined in S307 that timeout occurs, the processing stands by for the AP list request. The timeout herein occurs if the IP connection is not established with the communication partner apparatus or the AP list request is not received even when a predetermined time elapses after the operation for the AP setting start has been conducted in S301 or after the switching to the software AP mode has been performed in S305, and the processing is ended. At this time, the processing may be ended in a case, for example, where a display indicating the end of the processing is performed on the display unit 108, and the user performs an operation to agree the end of the processing.

When it is determined in S306 that the AP list request is accepted from the communication partner apparatus, the flow proceeds to S308, and the list of the information indicating the AP stored in the RAM 104 in S304 is transmitted via the WLAN unit 114. At this time, in a case where information of a plurality of APs exists, the information of the plurality of APs is transmitted. In a case where information of only a single AP exists, the information of the single AP is transmitted, and in a case where no AP that can perform the communication exists, information indicating that no AP that can perform the communication exists is transmitted. In a case where the AP that the MFP 100 can access does not exist, the processing is ended here.

In S309, it is determined whether or not AP information (SSID or the like of the AP included in the AP list) for identifying the AP is received from the communication partner apparatus after the AP list is transmitted in S308. The processing stands by for this reception of the AP information until it is determined in S310 that timeout occurs.

When it is determined in S309 that the AP information is received, the software AP mode is ended in S311, and the setting of the AP for the infrastructure mode is conducted in S312. Specifically, a designated AP is set as the relay AP at the time of the infrastructure mode in the RAM 104, and in a case where a cryptography key is to be used for using the AP, a registration of the cryptography key or the like is performed. At this time, an attempt of a connection with the designated AP is performed, for example, and the communication partner apparatus (herein, the mobile terminal 200) is notified of the result, for example, so that the communication partner apparatus may determine on whether or not the registration can be performed. Subsequently, when the registration of the AP is appropriately ended, the flow proceeds to S313, and the MFP 100 is set so that the MFP 100 is put in a state in which the wireless communication via the AP registered in the infrastructure mode can be performed (the normal infrastructure mode is set).

Accordingly, the MFP 100 is put in a state in which the wireless communication can be performed via the set (registered) AP.

Next, a description will be given of the processing by the mobile terminal 200 functioning as the communication partner apparatus in the processing of FIG. 3.

In FIG. 4, in S401, a wireless LAN setting application (application for setting the AP when the communication partner apparatus (the MFP 100 or the like) operates in the infrastructure mode) is activated by an operation by the user. This application is a program (software) stored in the non-volatile memory 205 and is previously installed by the user. Subsequently, in S402, a search for the AP that the mobile terminal 200 can access is performed by this application via the WLAN unit 210. This AP search may be automatically executed by the activation of the application or may be executed in response to an AP search instruction by the user. The AP search is performed while the beacons transmitted by the respective APs are received via the WLAN unit 210.

In S403, a list of APs (list of SSIDs) corresponding to the search result is displayed on the display unit 208. In S404, it is determined whether or not the user selects an AP from this list via the operation unit 107. When it is determined that the selection is made, the flow proceeds to S405, and it is determined whether or not the selected AP is a printer (apparatus) of a setting target in the present application. The determination in S405 is conducted on the basis of whether or not the AP has the SSID in the format following the above-described rule. When it is determined that the AP selected here is not the apparatus of the setting target in the present application, a display indicating that effect is performed by the display unit 208, and the flow stands by for the selection of the AP from the AP list again. In a case where the AP of the setting target in the present application does not exist in the AP list at this time or the AP desired by the user does not exist, the processing is ended here. In S404, the SSID in the format following the above-described rule may be automatically selected. At this time, in a case where a plurality of relevant SSIDs exist, only those SSIDs may be displayed on the display unit 208, and the user may perform the selection from those SSIDs.

In S405, in a case where the AP of the setting target (herein, the MFP 100) is selected, the mobile terminal 200 and the MFP 100 perform the exchange of the parameter for performing the wireless communication, for example, and the MFP 100 is requested to transit a list of APs that the MFP 100 can access in S406. Subsequently, in S407, the flow stands by for the reception of the AP list transmitted from the MFP 100 in S308. In a case where the AP list can be received before it is determined that the timeout occurs in S408, the flow proceeds to S409, and the received AP list is displayed on the display unit 208. In S408, when the timeout occurs in a case where the IP connection is not completed with the MFP 100, a case where the MFP 100 does not transmit the AP list within an expected time, or the like, the processing is ended.

In S410, the flow stands for the user to select the AP from the list displayed in S409 via the operation unit 207. When the AP is selected, the flow proceeds to S411, and it is determined whether or not the connection to the selected AP can be performed. Herein, in a case where a cryptography key for accessing the selected AP is to be used, the cryptography key input by the user via the operation unit 207 is used to cause the MFP 100 to attempt the connection. In a case where the cryptography key is not to be used, the MFP 100 is caused to attempt the connection without using the cryptography key. Subsequently, in S412, in a case where the connection is appropriately established before it is determined that the timeout occurs, the flow proceeds to S413, and the MFP 100 is instructed to register this AP in the MFP 100 (to set this AP on the RAM 104) as the AP for the infrastructure mode. In S412, in a case where the connection to the selected AP is not successfully established within a predetermined time, the processing is ended here.

In a case where the AP is selected in S410 without performing the processing in S411 and S412, the flow may proceed to S413. In this case, after the execution of S413, the determination as to whether or not the connection to the selected AP is executed on the MFP 100 side, the mobile terminal 200 is caused to perform a notification of the result, and whether or not the registration of the AP is succeeded is displayed on the display unit 208.

The configuration is not limited to a case where the processing in S402 to S404 is performed by the present application. The search may be performed by another application or the like which is already installed in the mobile terminal 200, and the result may be obtained by the present application.

As the result of the above-described operations, in the mobile terminal 200, the MFP 100 may be registered in the RAM 204 as the printer used in the infrastructure mode.

As described above, according to the present exemplary embodiment, the registration of the AP used when the MFP 100 operates in the infrastructure mode can be easily performed by the wireless communication between the mobile terminal 200 and the MFP 100. Therefore, the mobile terminal 200 and the MFP 100 may be located at a distance at which the respective apparatuses can mutually perform the wireless communication, and the user may avoid performing the operations on the respective apparatuses at the same time. In addition, the respective apparatuses may no longer be connected to each other by the fixed line cable. At this time, since the MFP 100 is once set in the soft AP mode, the MFP 100 can be identified by a general AP search on the mobile terminal 200 side. Subsequently, when the AP for the infrastructure mode is registered in the MFP 100, the MFP 100 is automatically set in the infrastructure mode, so that it is possible to promptly start the communication in the infrastructure mode. In addition, since the display of the AP list or the like is performed on the mobile terminal 200 side, the MFP 100 can also be structured without the display unit 108.

In the above-described example, by setting the MFP 100 in the soft AP mode, the MFP 100 can be searched for by the AP search performed by the mobile terminal 200, but the MFP 100 may be in another P2P mode, and other modes may also be adopted so long as the MFP 100 can be searched for by the wireless communication.

Moreover, in the above description, the MFP has been taken as an example as the communication apparatus operating in the infrastructure mode, but an apparatus in another mode may be employed so long as the apparatus can operate in the infrastructure mode and also the apparatus itself can operate as an access point. Furthermore, the mobile terminal has been taken as an example as the communication apparatus used by the user for performing the registration operation for the AP in the description, but an apparatus in another mode may also be employed so long as similar processing can be performed.

Processing similar to the above-described embodiment is also realized by executing the following processing. That is, in the processing, software (program) for realizing the functions of the above-described embodiment is supplied to a system or an apparatus via a network or various storage media, and a computer (or a CPU, an MPU, or the like) of the system or the apparatus reads out and executes the program. The computer that executes the program may be a single computer, or a plurality of computers operate in cooperation with each other to execute the program. Furthermore, hardware such as a circuit that executes a part of the program may be provided, and the hardware and the computer that executes the software may operate in cooperation with each other to execute the processing described according to the present exemplary embodiment.

According to the embodiment of the present invention, the registration of the relay access point with respect to the communication apparatus can be easily performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal capable of detecting a plurality of pieces of information related to a plurality of access points, comprising:
   a display control unit configured to perform a display processing for establishing a first wireless connection between the terminal and a communication apparatus; and
   a transmitting unit configured to transmit information related to a target access point, via the first wireless connection established between the communication apparatus and the terminal, the target access point being outside the terminal and outside the communication apparatus,
   wherein the first wireless connection is established after the display processing is performed,
   wherein a second wireless connection is established between the communication apparatus and the target access point based on the transmitted information related to the target access point, and
   wherein the terminal includes a setting application for setting the information related to the target access point used by the communication apparatus in the communication apparatus, and the display processing is to be performed using the setting application.

2. The terminal according to claim 1, wherein the display processing for prompting a user selection of information related to an access point in the communication apparatus is performed.

3. The terminal according to claim 1, wherein the display processing is performed after the setting application is activated by a user operation.

4. The terminal according to claim 1, wherein the communication apparatus is a printing apparatus.

5. The terminal according to claim 1, wherein the information related to the target access point is an SSID.

6. The terminal according to claim 1,
   wherein a predetermined screen is displayed as the display processing, and
   wherein the information related to an access point in the communication apparatus is displayed and information related to another access point is not displayed in the predetermined screen.

7. The terminal according to claim 1, wherein the display processing is performed based on the information related to an access point in the communication apparatus being not selected.

8. The terminal according to claim 1, wherein the terminal searches the plurality of pieces of information related to the plurality of access points by transmission of a beacon performed by each of the plurality of access points.

9. The terminal according to claim 1, wherein the first wireless connection and the second wireless connection are wireless connections in conformity with IEEE802.11 series.

10. The terminal according to claim 9, wherein the second wireless connection is a wireless connection in an infrastructure mode.

11. The terminal according to claim 1, wherein a part of information which is included in the information related to an access point in the communication apparatus is used for the display processing, wherein the access point in the communication apparatus is included in the plurality of access points.

12. The terminal according to claim 11, wherein the part of information which is included in the information related to the access point in the communication apparatus includes a manufacturer name.

13. The terminal according to claim 1, wherein the terminal has a telephone function.

14. The terminal according to claim 1, further comprising:
   a selection unit configured to display a selection screen for selecting the target access point and to select the target access point based on an instruction received via the selection screen.

15. The terminal according to claim 14, wherein the selection screen is displayed based on information obtained from the communication apparatus.

16. A method for controlling a terminal capable of detecting a plurality of pieces of information related to a plurality of access points, the method comprising:
   performing a display processing for establishing a first wireless connection between the terminal and a communication apparatus; and
   transmitting information related to a target access point, via the first wireless connection established between the communication apparatus and the terminal, the target access point being outside the terminal and outside the communication apparatus,
   wherein the first wireless connection is established after the display processing is performed,
   wherein a second wireless connection is established between the communication apparatus and the target access point based on the transmitted information related to the target access point, and
   wherein the terminal includes a setting application for setting the information related to the target access point used by the communication apparatus in the communicatoin apparatus, and the display processing is to be performed by using the setting application.

17. The method according to claim 16,
   wherein a predetermined screen is displayed as the display processing, and
   wherein the information related to an access point in the communication apparatus is displayed and information related to another access point is not displayed in the predetermined screen.

18. The method according to claim 16, wherein the display processing is performed based on the information related to an access point in the communication apparatus being not selected.

19. The method according to claim 16, wherein the display processing is performed after the setting application is activated by a user operation.

20. The method according to claim 16, wherein the first wireless connection and the second wireless connection are wireless connections in conformity with IEEE802.11 series.

21. The method according to claim 20, wherein the second wireless connection is a wireless connection in an infrastructure mode.

22. The method according to claim 16, wherein the communication apparatus is a printing apparatus.

23. The method according to claim 16, wherein the information related to the target access point is an SSID.

24. The method according to claim 16, wherein the terminal has a telephone function.

25. The method according to claim 16, further comprising:
   displaying a selection screen for selecting the target access point; and
   selecting the target access point based on an instruction received via the selection screen.

26. The method according to claim 25, wherein the selection screen is displayed based on information obtained from the communication apparatus.

27. The method according to claim 16, wherein the terminal searches the plurality of pieces of information related to the plurality of access points by transmission of a beacon performed by each of the plurality of access points.

28. The method according to claim 16, wherein a part of information which is included in the information related to an access point in the communication apparatus is used for the display processing.

29. The method according to claim 28, wherein the part of information which is included in the information related to the access point in the communication apparatus includes a manufacturer name.

30. The method according to claim 16, wherein the display processing for prompting a user selection of information related to an access point in the communication apparatus is performed.

31. A method for controlling a terminal capable of detecting a plurality of pieces of information related to a plurality of access points, wherein the terminal includes a setting application, the method comprising:
   performing a display processing for prompting a user selection of an SSID related to an access point in a communication apparatus after the setting application is activated;
   causing a display unit to display a selection screen for selecting information related to a target access point in a case where a first wireless connection between the access point in the communication apparatus and the terminal is established after the display processing is performed by the setting application, the selection screen being provided by the setting application, the target access point being outside the terminal and outside the communication apparatus; and
   transmitting information related to the target access point via the first wireless connection established between the access point in the communication apparatus and the terminal,
   wherein a second wireless connection is established between the communication apparatus and the target access point based on the transmitted information related to the target access point.

32. The method according to claim 31, wherein the communication apparatus is a printing apparatus.

33. The method according to claim 31, wherein the information related to the target access point is an SSID.

34. The method according to claim 31, wherein a predetermined screen is displayed as the display processing, and
   wherein the information related to the access point in the communication apparatus is displayed and information related to another access point is not displayed in the predetermined screen.

35. The method according to claim 31, wherein the selection screen is displayed based on information obtained from the communication apparatus.

36. The method according to claim 31, wherein the terminal has a telephone function.

37. The method according to claim 31, wherein the first wireless connection and the second wireless connection are wireless connections in conformity with IEEE802.11 series.

38. The method according to claim 37, wherein the second wireless connection is a wireless connection in an infrastructure mode.

39. The method according to claim 31, wherein the terminal searches the plurality of pieces of information related to the plurality of access points by transmission of a beacon performed by each of the plurality of access points.

40. The method according to claim 31, wherein a part of information which is included in the information related to an access point in the communication apparatus is used for the display processing.

41. The method according to claim 40, wherein the part of information which is included in the information related to the access point in the communication apparatus includes a manufacturer name.

* * * * *